UNITED STATES PATENT OFFICE.

JOHN E. FURBER, OF LAWRENCE, MASSACHUSETTS.

COMPOUND AS A SUBSTITUTE FOR YELK OF EGGS.

SPECIFICATION forming part of Letters Patent No. 458,420, dated August 25, 1891.

Application filed April 28, 1891. Serial No. 390,832. (Specimens.)

*To all whom it may concern:*

Be it known that I, JOHN E. FURBER, a citizen of the United States, residing at Lawrence, in the county of Essex and State of Massachusetts, have invented certain new and useful Improvements in a Compound as a Substitute for Yelks of Eggs; and I do hereby declare the following to be a full, clear, and exact description of the invention, such as will enable others skilled in the art to which it appertains to make and use the same.

The object of this invention is to obtain an artificial product to be used for culinary or other purposes in place of the yelk of an egg; moreover, to secure such a product as is adapted to all changes of temperature or moisture, and, further, one which does not become rancid or stale.

My invention consists in the combination of certain elements hereinafter fully specified, said elements being of a nutritious character and when united to contain the chemical constituents embodied in a natural egg.

Analysis shows that the yelk of an egg is composed of the following substances, combined in proper proportions, viz: water, albumen, fatty matter, termed "vitelline," and mineral salts.

To produce my new compound I unite the following substances: starch, animal or vegetable oil, albumen, carbonate of sodium and chloride of sodium, together with suitable harmless coloring-matter to imitate the yellow of the egg. I find that the elements which I compound, when used to imitate the yelk of an egg, would be so small in quantity that it becomes necessary to create a base of some nutritious material which will produce more bulk. Hence I employ starch—as rice, corn, or potato—and these may be substituted one for the other with good results.

I lieu of the vitellin or fatty matter I use oil, either animal or vegetable, while any nitrogenous organic matter of an albuminous nature may be used for the albumen in the yelk. If egg-albumen is used, then sodium carbonate and sodium chloride are likewise added; but if blood-albumen is employed then the lacking ingredients—sulphur and phosphates—must be added to supply such deficiency and in the proportions as they exist in the yelk of an egg. Lastly, suitable matter is added to color the compound and imitate as closely as possible the natural egg.

Presuming I have the above-named ingredients and I wish to compound a certain quantity of the product, I take, for illustration, fifty pounds of starch, which is to be preferably first suitably colored by thoroughly incorporating some harmless yellow matter, and such starch is then to be dried. The coloring-matter may, if desired, be added as the final step in producing the compound. To this quantity of starch so colored is added eight pounds of animal or vegetable oil, likewise six pounds of dry albumen, together with sodium chloride and sodium carbonate, provided egg-albumen is used. On the other hand, with blood-albumen, then sulphur and phosphates are added. These salts are added in the proportions such as exist in a natural egg, as follows: sodium carbonate, one per cent., (1%;) sodium chloride, five-tenths per cent., (.5%;) sulphur, six one-hundredths per cent., (.06%;) phosphates, seventy-eight one-hundredths per cent., (.78%.)

The above compound supplies an article of food which is heathful, harmless, and economical, likewise combines all the substances of the natural egg in the yelk and will keep an unlimited time under all circumstances.

For use in culinary purposes this compound must have liquid added to it. Since oil is employed, I find it best to employ milk, using one tea-spoonful of the mixture with one table-spoonful of milk, since the latter assimilates readily with the oil. Water, however, may be used provided the oil employed is in the form of an emulsion.

Directions for use: Follow your usual recipe, using for the white of each egg in the recipe one round tea-spoonful of the mixture and add one table-spoonful of milk for each tea-spoonful of the powder. Beat until thoroughly diffused. If the cake be of a delicate nature, use milk from the quantity designated and called for in the recipe. For frosting, the powder may be diffused in cold water—three table-spoonfuls of water to one of the powder—diffuse thoroughly, see that no lump remains, and beat as with eggs. In all cases diffuse in milk or water. Never mix with dry flour.

In the above formula I do not desire to be limited to the exact proportions as specified, since they may be varied—some increased and others diminished—in quantity without departing from my invention.

What I claim is—

1. As a new article of manufacture, a compound composed of starch, oil, albumen, sodium chloride, and sodium carbonate, in the proportions stated, substantially as explained.

2. As a new article of manufacture, a compound composed of starch, oil, albumen, sodium chloride, and sodium carbonate, in the proportions stated, together with suitable coloring-matter, substantially as explained.

3. As a new article of manufacture, a compound consisting of soluble vegetable or animal albumen, starch, animal or vegetable oil, carbonate of sodium, chloride of sodium, with sulphur and phosphates and suitable coloring-matter in proportions substantially as stated and described.

In testimony whereof I affix my signature in presence of two witnesses.

JOHN E. FURBER.

Witnesses:
WILBUR E. ROWELL,
JOHN C. SANBORN.